M. J. DALTON.
SIGNALING DEVICE FOR MOTOR VEHICLES.
APPLICATION FILED DEC. 15, 1915.
1,213,753.
Patented Jan. 23, 1917.
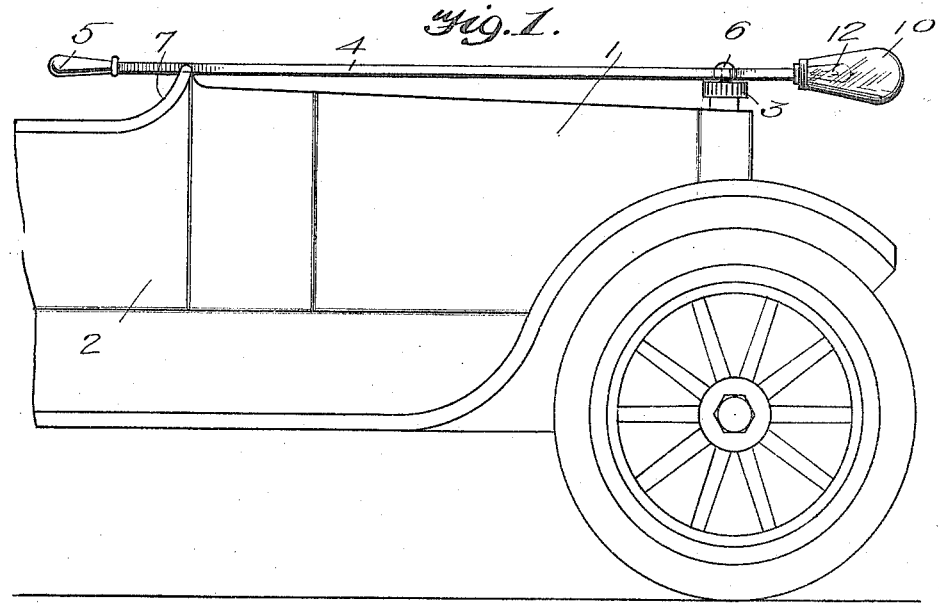
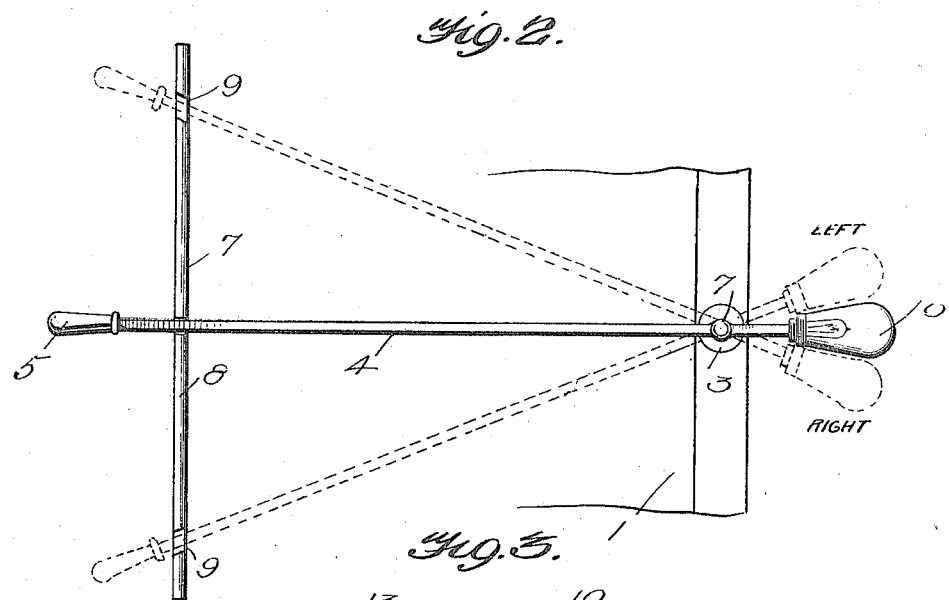
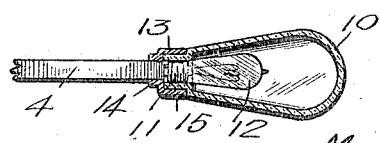
INVENTOR
MICHAEL J. DALTON,
BY Munn & Co
ATTORNEYS

UNITED STATES PATENT OFFICE.

MICHAEL J. DALTON, OF CHULA VISTA, CALIFORNIA.

SIGNALING DEVICE FOR MOTOR-VEHICLES.

1,213,753.  Specification of Letters Patent.  Patented Jan. 23, 1917.

Application filed December 15, 1915. Serial No. 66,933.

*To all whom it may concern:*

Be it known that I, MICHAEL J. DALTON, a citizen of the United States, and a resident of Chula Vista, in the county of San Diego and State of California, have invented certain new and useful Improvements in Signaling Devices for Motor-Vehicles, of which the following is a specification.

My invention is an improvement in signaling devices for motor vehicles, and the invention has for its object to provide an easily operated, inexpensive yet efficient device of the character specified, for use with motor vehicles of any character, wherein a staff or lever is provided, having at one end a signal and at the other a grip, and mounted on the hood to swing from side to side, to indicate whether the vehicle will continue straight ahead or turn, and in what direction the turn will be made.

In the drawings: Figure 1 shows a side view of a portion of an automobile provided with the improved signal; Fig. 2 is a top plan view of Fig. 1, and Fig. 3 is a longitudinal vertical section through the signal.

The present embodiment of the invention is shown in connection with the hood 1 of an automobile 2, and the device is connected with the filling cap 3 for the radiator.

The improvement comprises a staff or lever 4, having at one end a grip 5, and at the other the signal, to be later described.

The lever is pivoted by means of a pivot pin 6, to the filling cap 3 of the radiator, to permit the lever to take a position parallel with the direction of motion of the vehicle, or to swing at the grip end from side to side to swing the signal in the opposite direction.

The dashboard 7 of the vehicle is provided with a central notch 8 and with lateral notches 9, the notches 9 being spaced apart at equal distances from the central notch 8, and these notches 8 and 9 are of a depth such that when the lever or staff is in a notch, its upper edge will be approximately flush with the upper edge of the dashboard.

The signal is in the form of a globe 10 of approximately pear shape, the said globe being of any suitable transparent material, as for instance, glass, and the said globe is shaped to correspond roughly with the outline of an incandescent globe or lamp.

A socket 11 of ordinary construction is connected with that end of the staff or lever remote from the grip 5, and an incandescent light bulb 12 is connected with the socket in the usual manner. A ferrule 13 is connected with the staff or lever, at the signal, the said ferrule having a reduced portion 14 which fits tightly over the end of the staff or handle, and the ferrule is of sufficient diameter and is spaced apart from the socket 11 a sufficient distance to permit a reduced extension 15 on the open end of the globe 10 to fit between the said ferrule and the socket, and the ferrule holds the globe in place, inclosing the bulb 12.

It will be obvious that the bulb and the globe might be connected with the staff in any other suitable manner, and the lead wires which supply current to the bulb 12 are connected in any suitable or desired manner.

The grip 5 extends far enough in the rear of the dashboard 8 to permit it to be easily grasped by the driver. When the car is running straight ahead, the staff or lever is engaged with the central notch 8, and the said staff or lever is then parallel with the long axis of the car and with the direction of motion of the car.

When the driver intends to turn to the left, for instance, he will swing the grip 5 to the right, after disengaging it from the notch 8, until the lever drops into the notch 9 at the right of the driver. When the driver intends to turn to the right, he will swing the grip to the left, after disengaging it from the central notch 8, and will drop the lever into the notch 9. In the first instance, the signal globe 10 will be swung to the left, while in the last instance, the globe will be swung to the right. These movements are indicated in dotted lines in Fig. 2.

The globe 10 is preferably colored red, so that a red light will appear when the circuit is closed.

The improved signal, while simple in construction and inexpensive, is yet very efficient, indicating beyond any chance of doubt the intentions of the driver, as regards turning or going ahead. The only changes required in the vehicle are the notches 8 and 9. The notches or holders for the lever are merely to prevent displacement of the lever and of the signal.

I claim:

In combination with a motor vehicle, of a signal for indicating the direction of turning, said signal comprising a lever having adjacent one end a vertical pivot connecting the lever to the filling cap of the radiator and carrying a signal at the said end and a grip at the other end, said lever extending rearwardly of the dashboard, and the said board having notches for holding the lever in adjusted position.

MICHAEL J. DALTON.

Witnesses:
W. E. COOK,
WILLIAM J. CARR.